J. Hubbell,
Saw-Mill Head-Block.

No. 66,152. Patented June 25, 1867.

Witnesses:
Theo Tusche
Wm. Trewn

Inventor:
Joseph Hubbell
per Munn
Attorneys

United States Patent Office.

JOSEPH HUBBELL, OF ZANESVILLE, OHIO

Letters Patent No. 66,152, dated June 25, 1867.

---

IMPROVEMENT IN HEAD-BLOCKS FOR SAW-MILLS.

---

The Schedule referred to in these Letters Patent and making part of the same.

---

TO ALL WHOM IT MAY CONCERN:

Be it known that I, JOSEPH HUBBELL, of Zanesville, Muskingum county, Ohio, have invented a new and useful Improvement in Saw-Mills; and I do hereby declare that the following is a full, clear, and exact description thereof, which will enable others skilled in the art to make and use the same, reference being had to the accompanying drawings, forming part of this specification, in which—

Figure 1:
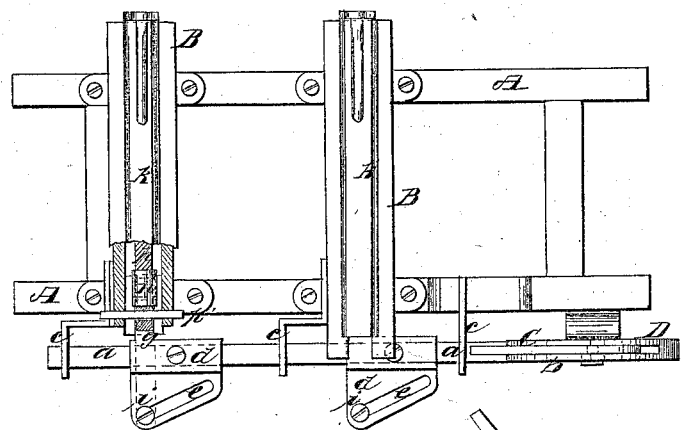

Figure 1 is a top view of the carriage with my improvements attached.

Figure 2:
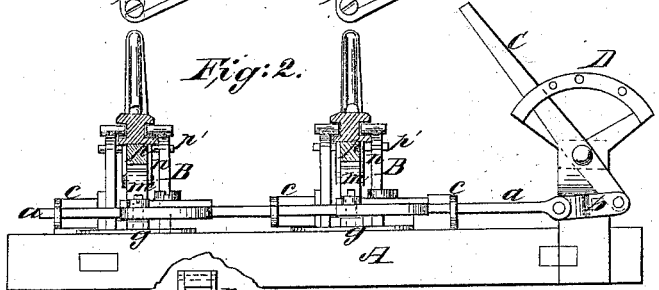

Figure 2, a side view.

Figures 3, 4:
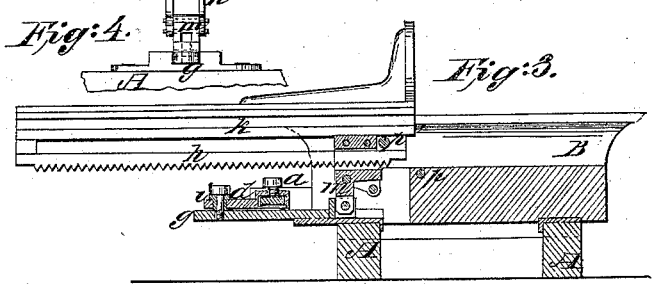

Figure 3, a section through one of the head-blocks, taken in the line $x\,x$, fig. 1; and Figure 4, a detail end view of the pushing-bar and rack-pawl.

Similar letters of reference indicate corresponding parts.

This invention relates to new and useful improvements in saw-mills, and consists in devices and arrangements for operating the head-blocks and setting the logs for a saw with perfect accuracy to cut boards of uniform thickness, as hereinafter described.

A represents the carriage of an ordinary saw-mill, and B B the head-blocks. On the outside of the carriage is the horizontal iron setting-bar $a$, connected by pin-joint to the link $b$, which is also connected by pin-joint to the hand-lever C, working in the segmental guide D, which is provided with a series of holes for receiving pins to regulate the movement of the lever C and the operation of the setting-bar, according to the thickness of the plank to be sawed. The setting-bar $a$ passes through slotted guides $c\,c\,c$, fastened to the carriage to be moved back and forth in the guides by the hand-lever C. Plates $d\,d$ are made fast in the bar $a$ at the ends of the head-blocks, in which plates are inclined or diagonal slots $e\,e$ for actuating the pushing-bars $g\,g$, to move the racks $h\,h$ and the jacks $k\,k$ with them. This movement of the pushing-bars is effected by means of friction-rollers $i\,i$ on pins in the ends of the bars, which rollers work in the slots $e\,e$. The friction-bar $g$ for each head-block is connected by pin-joint with an elbow-lever pawl, $m$, that has its pivot or fulcrum in a yoke or collar, $n$, that fits around the rack $h$, as seen in detail, fig. 4. The rack $h$ has teeth, in which the pawl $m$ engages to move it forward for setting the log to the saw, which operation, it will be seen, is effected by drawing the hand-lever C forward to slide the setting-bar $a$, when the friction-roller $i$ moves in the slot $e$ in the stationary plate $d$, and thus pushes in the bar $g$ to engage the pawl $m$ with the rack $h$, and move it forward with the jacks against the log to set it the proper distance for the saw, holding it firmly in position for sawing.

When the rack is pushed forward its proper limit, it is stopped in its movement by a pin, $p$, that runs through the head-block and catches the end of the pawl $m$, and it is also stopped when it is pulled back by another pin, $p'$, that catches against the end. When the rack is drawn back the pawl $m$ drops and disengages itself therefrom.

Having described my improvements and operation, I claim as new, and desire to secure by Letters Patent—

The slotted plates $d\,d$, made fast on the setting-bar $a$, in combination with the friction-rollers $i\,i$ on the end of the pushing-bars $g\,g$, the pawl $m$, and the rack $h$, constructed, arranged, and operating as and for the purposes herein described.

The above specification of my invention signed by me this 29th day of January, 1867.

JOSEPH HUBBELL

Witnesses:
JOHN GREAVES,
F. B. ABBOT.